US006125355A

United States Patent [19]
Bekaert et al.

[11] Patent Number: 6,125,355
[45] Date of Patent: Sep. 26, 2000

[54] PRICING MODULE FOR FINANCIAL ADVISORY SYSTEM

[75] Inventors: Geert Bekaert, Menlo Park; Steven R. Grenadier, Los Altos; Christopher L. Jones, Foster City; Jason S. Scott; John G. Watson, both of Menlo Park, all of Calif.

[73] Assignee: Financial Engines, Inc., Palo Alto, Calif.

[21] Appl. No.: 08/982,941

[22] Filed: Dec. 2, 1997

[51] Int. Cl.[7] .................................................. G06F 17/60
[52] U.S. Cl. .............................. 705/36; 705/35; 705/7; 705/10; 705/38
[58] Field of Search .................... 705/35, 4, 36, 705/1, 7, 10, 38

[56] References Cited

U.S. PATENT DOCUMENTS

| | | | |
|---|---|---|---|
| 3,634,669 | 1/1972 | Soumas et al. | 705/4 |
| 3,697,693 | 10/1972 | Deschenes et al. | 705/38 |
| 4,007,355 | 2/1977 | Moreno | 235/379 |
| 4,334,270 | 6/1982 | Towers | 705/36 |
| 4,346,442 | 8/1982 | Musmanno | 705/36 |
| 4,376,978 | 3/1983 | Musmanno | 705/36 |
| 4,597,046 | 6/1986 | Musmanno et al. | 705/36 |
| 4,642,767 | 2/1987 | Lerner | 705/30 |
| 4,722,055 | 1/1988 | Roberts | 705/36 |
| 4,742,457 | 5/1988 | Leon et al. | 705/35 |
| 4,752,877 | 6/1988 | Roberts et al. | 705/35 |
| 4,774,663 | 9/1988 | Musmanno et al. | 705/36 |
| 4,868,376 | 9/1989 | Lessin et al. | 235/492 |
| 4,876,648 | 10/1989 | Lloyd | 705/38 |
| 4,885,685 | 12/1989 | Wolfberg et al. | 705/14 |
| 4,910,676 | 3/1990 | Alldredge | 705/37 |
| 4,933,842 | 6/1990 | Durbin et al. | 705/30 |
| 4,953,085 | 8/1990 | Atkins | 705/36 |
| 4,989,141 | 1/1991 | Lyons et al. | 705/36 |
| 5,025,138 | 6/1991 | Cuervo | 705/38 |
| 5,220,500 | 6/1993 | Baird et al. | 705/36 |
| 5,454,104 | 9/1995 | Steidlmayer et al. | 707/4 |
| 5,523,942 | 6/1996 | Tyler et al. | 705/4 |
| 5,590,037 | 12/1996 | Ryan et al. | 705/4 |
| 5,592,379 | 1/1997 | Finfrock et al. | 705/39 |
| 5,644,727 | 7/1997 | Atkins | 705/40 |

OTHER PUBLICATIONS

Sharpe, "Asset Allocation: Management Style and Performance Measurement", The Journal of Portfolio Management, Winter 1992, vol.18, No.2, pp. 1–14.

Sharpe, et al., "Investments", Fifth Edition, Chapter 8, pp. 193–231, Chapter 11, pp. 293–321, Chapter 23, pp. 827–863, 1995.

J.C. Cox, et al., "An Intertemporal General Equilibrium Model of Asset Prices", Econometrica 53, pp.385–408, 1985.

J.C. Cox, et al., "A Theory of the Term Structure of Interest Rates", Econometrica 53, pp. 363–384, 1985

D. Duffie, et al., "A Yield–Factor Model of Interest Rates", Mathematical Finance 6, pp. 379–406, 1996.

D. Backus, et al., "An Affine Model of Currency Pricing", a working paper, 1996.

Q. Dai, et al., "Specification Analysis of Affine Term Structure Models", a working paper, 1997.

R.E. Lucas, Jr., "Asset Prices in an Exchange Economy"m Econometrica 46, pp. 1426–1446, 1978.

T–S Sun, "Real and Nominal Interest Rates: A Discrete–Time Model and its Continuous–Time Limit", Review of Financial Studies, 5, pp. 581–612, 1992.

S. Richard, "An Arbitrage Model of Term Structure of Interest Rates", Journal of Financial Economics, 6, pp. 33–57, 1978.

G.S. Bakshi, et al., "Inflation, Asset Proces and the Term Structure of Interest Rates in Monetary Economies", Review of Financial Studies 9, pp. 237–271, 1996.

E.F. Fama, et al., "Permanent and Temporary Components of Stock Prices", Journal of Political Economy Apr. 1998, pp. 246–273.

J. Poterba, et al., "Mean Reversion in Stock Prices: Evidence and Implications", Journa l of Financial Economics, 22, pp. 27–59, 1988.

E.F. Fama, et al., "Asset Returns and Inflation", Journal of Financial Economics, 5, pp. 115–146.

E.F. Fama, et al., "Dividend Yields and Expected Stock Returns", Journal of Financial Economics, Oct. 1988, pp. 3–26.

C.R. Harvey, "Time–Varying Conditional Covariances in Tests of Asset Pricing Models", Journal of Financial Economics, 24, pp. 289–317, 1989.

Sharpe, "Asset Allocation: Management Style and Performance Measurement", The Journal of Portfolio Management, Winter 1992, vol. 18, No. 2, pp. 1–14.

Woodwell, "Automating Your Financial Portfolio", Second Edition, Dow Jones–Irwin, 1983 & 1986.

The Funds Management Group, Inc., "Funds Allocation System", Software Update, 8 pages. No date.

IFPS/Optimum "The Extended Analysis Language for All Users", 1986, 2 pages.

Henry Fersko–Weiss, "Dialing for Profits, Managing the Market", Product Reviews, Personal Computing, May 1986.

"A Financial Planner With Nerves of Silicon", Business Week, Oct. 7, 1985, p. 108.

Fayette Hickox, Information Technology, " Learning about Artificial Intelligence", Institutional Investor, Jul. 1986, pp. 209–210.

Daniel P. Wiener, "Software Packages for Investors", Fortune/1987 Investors Guide, pp. 185–188.

Paul Lichtman, "Software: The Professional Plan", Lotus, Nov. 1986, pp. 121 & 140.

*Primary Examiner*—Emanuel Todd Voeltz
*Assistant Examiner*—George D. Morgan
*Attorney, Agent, or Firm*—Blakely, Sokoloff Taylor & Zafman, LLP

[57]  ABSTRACT

The pricing module of the present invention provides a single module that models both fixed-income securities and equity securities into the future in an arbitrage-free model. Because the modeling includes both fixed-income securities and equity securities that are modeled based on common input state variables and does not allow arbitrage conditions between the fixed-income securities and the equity securities (as well as no arbitrage within a security class), the present invention provides an improved pricing module as compared to those in the prior art.

51 Claims, 4 Drawing Sheets

PRICING MODULE FOR FINANCIAL ADVISORY SYSTEM

FIELD OF THE INVENTION

The present invention relates to financial advisory systems, and more particularly to a pricing module for financial analysis and advisory systems.

BACKGROUND

A pricing module is a computer program or a part of a computer program used to estimate future prices for one or more assets. Pricing modules use various economic or empirical financial models (a special class of which is known as pricing kernels) to generate price estimates. Inputs to pricing modules typically include economic variables such as interest rates, inflation, foreign exchange rates, etc. Outputs from the pricing modules are one or more estimated prices for assets priced at one or more future dates, as well as predictions for other economic variables. Thus, pricing modules are used to determine a projected future value of assets based on the economic factors used as inputs.

Many prior art pricing modules are based on models of the term structure of interest rates. Such models are typically based on the economic model disclosed in "An Intertemporal General Equilibrium Model of Asset Prices," Econometrica 53, 363–384 (1985) and "A Theory of the Term Structure of Interest Rates," Econometrica 53, 385–408 (1985) both by J. C. Cox, J. E. Ingersoll and S. A. Ross. More recently, in "A Yield-Factor Model of Interest Rates," Mathematical Finance 6, 379–406 (1996) by D. Duffie and R. Kan, a class of affine term structure models where the yield of any zero-coupon bond is an affine function of the set of state variables was disclosed. The model disclosed by Duffie and Kan is an arbitrage-free model. Arbitrage is the simultaneous purchase and sale of the same, or similar, assets in two different markets for advantageously different prices. The absence of arbitrage in a pricing module is desirable because this prevents an investor from making "free money".

In a pricing module disclosed by Duffie and Kan, the affine model is fully characterized by a set of stochastic processes for state variables and a pricing kernel. The pricing kernel is a stochastic process that limits the prices on the assets and payoffs in such a way that no arbitrage is possible. However, these pricing modules and models on which they are based typically use state variables that are either particular asset yields or assumed and unobserved factors without a clear economic interpretation. Empirical applications of these affine models to interest rate data and foreign exchange data are well known in the art. See, for example, "An Affine Model of Currency Pricing," a working paper (1996) by D. Backus, S. Foresi and C. Telmer and "Specification Analysis of Affine Term Structure Models," a working paper (1997) by Q. Dai and K. K. Singleton.

Prior art pricing modules, however, have had little application beyond term structure modeling. Thus, a need exists for a pricing module that provides term structure modeling as well as equity modeling. More specifically, by using a term structure that varies stochastically over time in a partially predictable manner, models of the term structure may also be used for equity valuation. By applying a pricing module approach to both bonds and equities, the present invention provides a simple and unified arbitrage-free approach to pricing both fixed-income securities (e.g., bonds) and equity securities (e.g., stocks).

SUMMARY OF THE INVENTION

A method and apparatus for pricing equity securities and fixed-income securities having a no arbitrage constraint is disclosed. In one embodiment of the present invention, fixed-income security pricing is based on an inflation value, a real rate value and a term structure risk parameter. Equity security pricing is based on the inflation value, the real rate value, the term structure risk parameter value, a dividend growth value, and an equity correlation parameter.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for arbitrage-free pricing of fixed-income securities and of equity securities is described. In the following description, numerous details are set forth, such as particular assets, functional units, equations, etc. It will be apparent, however, to one skilled in the art, that the present invention may be practiced without these specific details. In other instances, well-known structures and devices are shown in block diagram form, rather than in detail, in order to avoid obscuring the present invention.

The pricing module of the present invention provides a single module that models both fixed-income securities and equity securities into the future in an arbitrage-free model. Because the modeling includes both fixed-income securities and equity securities that are modeled based on common input state variables and does not allow arbitrage conditions between the fixed-income securities and the equity securities (as well as no arbitrage within a security class), the present invention provides an improved pricing module as compared to those in the prior art.

Overview of a Pricing Module Theoretical Structure

In one embodiment, the pricing module of the present invention provides an arbitrage-free stochastic affine term model for fixed-income security and for equity security pricing projected in the future. In contrast to typical prior art pricing modules using affine term structures, the present invention includes state variables that are economic variables (e.g., inflation, real rate, dividend growth) having economic equilibrium underpinnings. The model of the present pricing module combines a real economic equilibrium setting with a specification for inflation adjusted pricing of dollar denominated assets. In addition, the pricing module of the present invention provides a unified arbitrage-free environment for pricing both fixed-income and equity securities. The pricing module is specified so that the model can be supported in equilibrium by an exchange economy as disclosed in "Asset Prices in an Exchange Economy," Econometrica 46, 1426–1446 (1978) by R. E. Lucas, Jr. or a production economy as described in "Real and Nominal Interest Rates: A Discrete-Time Model and its Continuous- Time Limit," Review of Financial Studies, 5, 581–612 (1992) by T-S Sun.

In one embodiment, the model used by the pricing module of the present invention is a three-factor affine term structure model and a quasi-affine present value relation for stocks. By a quasi-affine relation for stocks, what is meant is an expression for the equilibrium price to dividend ratio can be expressed as a sum of exponentials of affine functions. Thus, the model is capable of deriving valuation functions for bonds via a term structure and equity returns. The term structure model is different than "An Arbitrage Model of Term Structure of Interest Rates," Journal of Financial Economics, 6, 33–57 (1978) by S. Richard and "Real and Nominal Interest Rates: A Discrete-Time Model and its Continuous-Time Limit," Review of Financial Studies, 5, 581–612 (1992) by T-S Sun. For example, the model disclosed by Sun assumes that endowment growth, inflation, and expected inflation follow different stochastic processes than those described below. The model disclosed by Richard is substantially different than the present invention in that the pricing kernel of Richard is implicit and relies on prices for two exogenously determined bonds. In addition, the price of risk is treated differently in the model of Richard than in the present invention. In one embodiment, the pricing module of the present invention provides an accurate approximation of the price to dividend ratio to greatly increase the speed at which the price to dividend ratio is determined as compared to calculating a sum of exponentials.

The output of the pricing module of the present invention is more general than the model disclosed by "Inflation, Asset Prices and the Term Structure of Interest Rates in Monetary Economies," Review of Financial Studies 9, 237–271 (1996) by G. S. Bakshi and Z. Chen and facilitates an empirical analysis using stock market data because the Roll critique as disclosed in the Journal of Financial Economics in March 1977 is avoided. In the model disclosed by Bakshi and Chen, dividend growth process depends on two exogenous square root processes, which do not have a clear economic interpretation. As mentioned above, the present invention models an economy with state variables having economic equilibrium underpinnings. The model on which the pricing module of the present invention is based is general and provides a valuation model with many applications in various areas of asset pricing. In one embodiment, short-term and long-term nominal and real bond pricing is provided along with stock pricing; however, other assets may also be priced, for example, mutual funds, warrants, stock options and other derivative equity securities.

The pricing module of the present invention is calibrated to replicate historical moments of interest rates, bond returns, stock returns and other economic variables. The outputs potentially satisfy predictability according the mean-reversion as disclosed in "Permanent and Temporary Components of Stock Prices," Journal of Political Economy (April), 246–273 (1988) by E. F. Fama and K. R. French and "Mean Reversion in Stock Prices: Evidence and Implications," Journal of Financial Economics, 22, 27–59 (1988) by J. Poterba and L. Summers. Outputs of the pricing module also potentially satisfy predictability of inflation and nominal interest rates as disclosed in "Asset Returns and Inflation," Journal of Financial Economics, 5, 115–146 by E. F. Fama and W. G. Schwert, predictability using dividend yields as disclosed in "Dividend Yields and Expected Stock Returns," Journal of Financial Economics (October), 3–26 (1988) by E. F. Fama and K. R. French and predictability through term spreads as disclosed in "Time-Varying Conditional Covariances in Tests of Asset Pricing Models," Journal of Financial Economics, 24, 289–317 (1989) by C. R. Harvey.

Based on the foregoing, it can be seen that the pricing module of the present invention applies a novel modeling technique to provide both stock and bond pricing within a single arbitrage-free structure. These pricing data may be used, for example, in a financial advisory system that models asset valuation based on factor models or other types of simulation to project a future valuation for one or more assets. Because the pricing module of the present invention provides both stock and bond pricing in an arbitrage-free environment, a wider range of assets may be simulated with a greater degree of accuracy and realism than would otherwise be possible.

Figure 1:
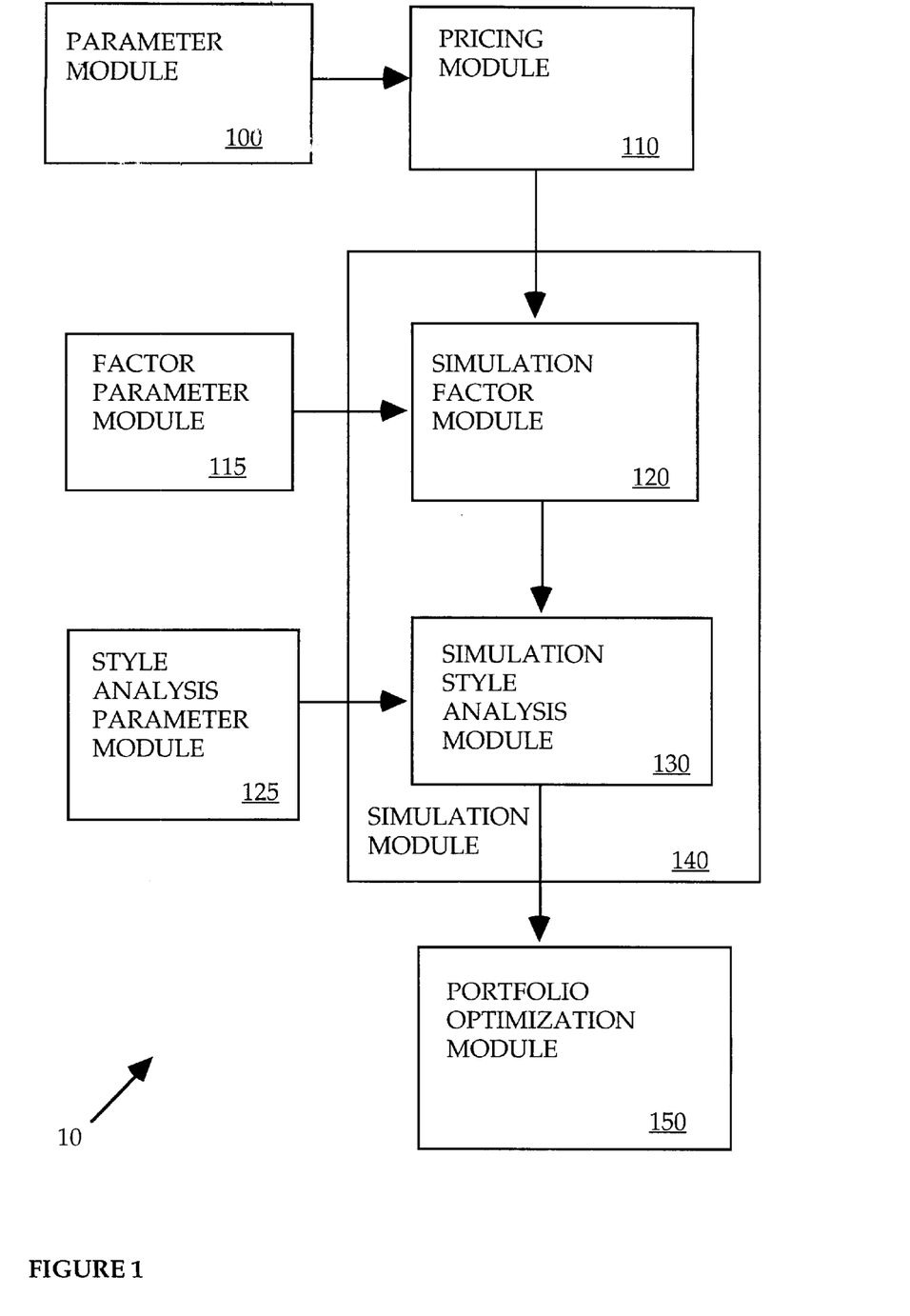
FIG. 1 is one embodiment of a block diagram of a financial analysis tool the may incorporate the present invention.

Overview of One Embodiment of a Financial Advisory System Having a Pricing Module FIG. 1 is one embodiment of a block diagram of a financial advisory system in which a pricing module according to the present invention may be used. Generally, the financial advisory system includes a parameter module that provides inputs to the pricing module and a simulation module that receives outputs from the pricing module to perform financial advisory functions. The simulation module provides input to a portfolio optimization module that determines one or more optimal portfolios.

Parameter module 100 provides inputs such as inflation data, interest rate data, dividend data, etc. to pricing module 110. Of course, parameter module 100 may provide data in addition to, or other than, the data listed. Parameter module 100 may also provide sensitivity data for particular assets with respect to particular input data, such as how sensitive particular assets are to changes in interest rates. In one embodiment, parameter module 100 resides on a server that is accessed by a client device having a pricing module, such as pricing module 110. Alternatively, both parameter module 100 and pricing module 110 reside on the same computer.

Pricing module 110 receives data from parameter module 100 and generates pricing data for one or more assets. In one embodiment, pricing module 110 generates pricing data for three assets (e.g., short-term bonds, long-term bonds and U.S. equities). These assets are used as core assets by simulation module 140 for simulation functions. Alternatively, the core assets may be different types of assets, such as U.S. equities and bonds (making no distinction between short-term and long-term bonds). Of course, a different number of core assets may also be used.

In one embodiment, pricing module 110 generates a number of asset scenarios. Each scenario is an equally likely outcome based on the inputs to financial advisory system 10. By generating a number of scenarios with pricing module 110, financial advisory system 10 generates statistics for different projected asset valuations. For example, financial advisory system 10 may provide confidence intervals for each projected asset valuation.

In one embodiment, simulation module 140 has two primary parts: simulation factor module 120 and simulation style analysis module 130. Simulation factor module 120 receives core asset pricing data from pricing module 110. In addition, simulation factor module 120 receives parameters from factor parameter module 115. Factor parameter module 115 maps historical factor returns onto historical core asset returns. The historical factor analysis performed in factor parameter module 115 is well known in the art and is not described in greater detail herein. Simulation factor module 120 utilizes the historical relationship determined in factor parameter module 115 and utilizes core asset pricing data from pricing module 110 to simulate future factor prices.

Simulation style analysis module 130 receives factor asset pricing data from simulation factor module 120. In addition, simulation style analysis module 130 receives parameters from style analysis parameter module 125. Style analysis parameter module 125 maps historical mutual fund returns onto historical factor asset returns. The historical style analysis performed in the style parameter module 125 is well known in the art and is not described in greater detail herein. Style analysis parameter module 125 may perform the functions as described in "Asset Allocation: Management Style and Performance Measurement," by William F. Sharpe, Journal of Portfolio Management, Vol. 18, No. 2, which is hereby incorporated by reference. Simulation style analysis module 130 utilizes the historical relationship determined in style analysis parameter module 125 and utilizes factor asset pricing data from simulation factor module 120 to simulate future mutual fund prices.

Outputs of style analysis module 130 are provided to portfolio optimization module 150, which determines one or more optimal portfolios based on input provided to financial advisory system 10. Portfolio optimization may be performed in any manner known in the art and is not central to the present invention.

Further description of a financial advisory system is disclosed in a U.S. Patent application entitled "FINANCIAL ADVISORY SYSTEM," application Ser. No. 08/982,942, filed on Dec. 2, 1997, and a U.S. patent application entitled "USER INTERFACE FOR A FINANCIAL ADVISORY SYSTEM," application Ser. No. 08/988,226, filed on Dec. 10, 1997, now U.S. Pat. No. 5,918,217, both of which are assigned to the corporate assignee of the present invention.

Pricing Module Embodiment

In one embodiment, the pricing module incorporates term structure information and equity pricing information. Integrating the dividend process with the other parameters ensures that an arbitrage free result is obtained across both stocks and bonds. In addition, relationships between stocks, bonds and interest rates are arbitrage free. This provides the ability to generate expected return scenarios along different asset classes in a way that is coherent and consistent with financial and economic theory.

In one embodiment, the pricing module receives as inputs three state variables and two free parameters. The state variables are: inflation ($\pi$); real rate of interest ($\chi$); and dividend growth ($\Delta d$). The free parameters are: term structure risk ($\lambda$) and an equity correlation ($\beta$). From these inputs, outputs for bond pricing and stock pricing are generated for multiple terms.

In one embodiment, the pricing module outputs three values: short-term bond pricing, long-term bond pricing and stock pricing. Alternatively, a subset of these outputs may be output, for example, stock pricing and bond pricing may be output, or short-term and long-term bond pricing may be output. In general, any asset which can be priced based on the state variables received as inputs may also be output. Modeling may be performed in either a discrete-time environment or a continuous-time environment.

Figure 2:
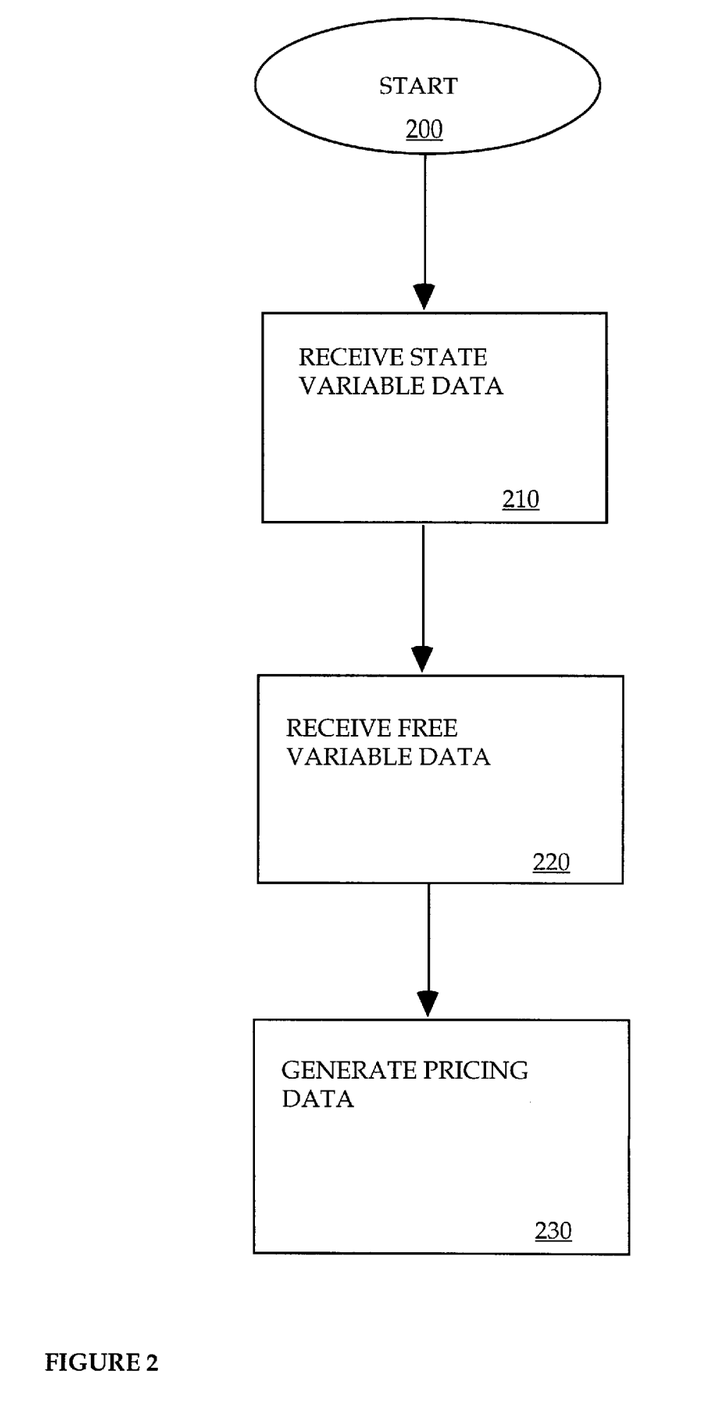
FIG. 2 is one embodiment of a flow diagram for pricing fixed-income securities and equity securities according to the present invention.

FIG. 2 is one embodiment of a flow diagram for pricing fixed-income securities and equity securities according to the present invention. In order to simplify the description of the pricing module, a brief overview of the steps performed is given with respect to FIG. 2 and a more detailed description including specific embodiments is provided thereafter.

Processing starts with step 200. Pricing module 110 (not shown in FIG. 2) receives state variable data in step 210. In one embodiment, state variable data includes data related to inflation, the real rate and dividend growth. Of course, other or alternative data may also be received. As mentioned above, pricing module 110 may be on a client device and receive state variable data from a server device. Alternatively, pricing module 110 may receive state variable data from another portion of the computer on which pricing module 110 resides, such as from random access memory (RAM), a hard disk, or other storage devices.

In step 220, pricing module 110 receives free variable data. In one embodiment, free variable data includes a term structure risk parameter and an equity correlation parameter. Of course, other free variables could also be used. As with the state variable data, free variable data may be received from a server or the computer in which pricing module 110 resides. The step of receiving state variable data and the step of receiving free variable data are shown and described as distinct steps because the respective data may be received from different sources. However, if the state variable data and the free variable data are received from a common source steps 210 and 220 may be combined. Also, the order of steps 210 and 220 may be reversed.

In step 230, pricing module 110 generates multiple scenarios for the assets priced. In one embodiment, pricing data is generated for many hundreds of scenarios. A scenario is a set of projected future values for core assets. Multiple scenarios are generated so that statistical data can be generated for future values of the core assets.

According to one embodiment the three state variables used by pricing module 110 are inflation, short-term real rate and dividend growth. Each of these functions includes a shock term, or innovation term, that provides a measure of randomness such that multiple scenarios may be generated by pricing module 110.

The pricing data for the core assets can be used in a variety of ways, including, but not limited to the simulations discussed above with respect to financial advisory system 10 of FIG. 1. The data output by pricing module 110 may be used without further processing to project future values for the particular assets for which pricing module 110 generates pricing data. In addition the data output by the pricing module 110 may be used to generate derived statistics for the particular assets, including but not limited to standard deviations, covariances, correlations and percentiles of the return or price distributions.

A. Inflation

In one embodiment, inflation is modeled as a heteroskedastic stochastic process. A heteroskedastic stochastic process is a random variable, indexed by time where variance may change over time. A heteroskedastic stochastic process can allow for larger changes when the function has a larger value and smaller changes when the function value is smaller. For example, using the process described below, when inflation is 20%, the change between the current value and the next future value is potentially larger than when inflation is 3%. In one embodiment, inflation at time t+1 is determined according to:

$$\pi_{t+1} = \mu_\pi + \rho_\pi \pi_t + \sigma'_\pi \sqrt{\pi_t}\, \varepsilon^\pi_{t+1} \qquad \text{Equation 1}$$

where $\mu_\pi$ is a constant term, $\rho_\pi$ is a first-order autocorrelation (also called a serial correlation) for the observed inflation over a period of time, $\pi_t$ is an inflation value for time t, $\sigma'_\pi$ is selected such that the standard deviation of predicted inflation values approximate the standard deviation of the observed inflation over a period of time, and $\varepsilon_{t+1}^\pi$ is a shock term chosen by a standard normal random variate function. Of course, other heteroskedastic stochastic processes may be used as well as other types of functions to predict inflation values.

Using Equation 1, only a starting value for inflation along with the constant term, the first-order autocorrelation for inflation and the standard deviation value are required for modeling inflation. Because Equation 1 is a heteroskedastic stochastic process, it is related to past values and kept within certain ranges such that the inflation values do not get unreasonably high or unreasonably low.

The constant term implies projected mean inflation values within the range of historically observed inflation values and is related to the unconditional mean of observed inflation over a period of time by $$\mu_\pi = (1-\rho_\pi)\bar{\mu}_\pi \qquad \text{Equation 2}$$

where $\bar{\mu}_\pi$ is the unconditional mean of observed inflation over a period of time. In one embodiment, 45 years of inflation data is used to determine the unconditional mean of historically observed inflation and the unconditional mean for historical inflation is 3.5%. Of course other time periods could be observed and other values could be used for historical inflation. The unconditional mean for historical inflation may be updated periodically as new data become available. A heteroskedastic or other type of inflation process could also be derived without the use of an unconditional mean for historically observed inflation.

The first-order autocorrelation value for observed inflation is determined over the same period of time as for determining the historical mean for inflation and provides an indication of how persistent inflation tends to be from period to period. When inflation is above (or below) its unconditional mean, the process output tends to move toward the unconditional mean. In one embodiment, the first-order autocorrelation value is 0.75; however, other values may also be used. The first-order autocorrelation value is multiplied by the inflation value for the past time period ($\pi_t$) so that predicted values of inflation behave in a similar manner as observed historical inflation values.

The value for $\sigma'_\pi$ is not a standard deviation value based on historical data for inflation. The value for $\sigma'_\pi$ is chosen so that the standard deviation for predicted inflation values (i.e., the results from Equation 1) approximate the standard deviation for observed inflation over the period of time used to determine the unconditional mean for inflation and the first-order autocorrelation for inflation. In one embodiment, $$\sigma'_\pi = \sigma_\pi \sqrt{\frac{(1-\rho_\pi^2)}{\bar{\mu}_\pi}} \qquad \text{Equation 3}$$

where $\sigma_\pi$ is the standard deviation of observed inflation over a period of time and $\bar{\mu}_\pi$ is the unconditional mean of observed inflation over a period of time.

The value of $\sigma'_\pi$ is multiplied by the square root of the previous value of inflation as determined by Equation 1. The term $\sigma'_\pi\sqrt{\pi_t}\epsilon_{t+1}^\pi$ makes Equation 1 a heteroskedastic stochastic process. The standard deviation of the function is scaled by a square root of a previous value of the function to keep the function from maintaining an excessively high or excessively low value.

The final variable in Equation 1 is a shock term ($\epsilon_{t+1}^\pi$) that is distributed as a standard normal variate. In other words $\epsilon_{t+1}^\pi$ is drawn from a standard normal distribution with a mean of 0 and a standard deviation of 1. A value is selected for each evaluation of Equation 1. This shock term gives Equation 1 an unpredictability component. Because of the structure of Equation 1 and the fact that Equation 1 is a heteroskedastic stochastic process, the shock term does not force unrealistically high or unrealistically low values for the inflation process.

In one embodiment, the values for inflation are determined on a server and downloaded to a client when a user wishes to use the pricing module. Alternatively, inflation values may be projected locally each time a user wishes to use the pricing module.

B. Real Rate

In one embodiment, the real rate is a heteroskedastic stochastic process. The equation for real rate is in the same form as the equation for inflation discussed above. Thus, a starting value for real rate, a constant term, a first-order autocorrelation value and a standard deviation value are used to model the real rate. In one embodiment, the real rate is determined according to:

$$x_{t+1} = \mu_x + \rho_x x_t + \sigma'_x \sqrt{x_t}\, \epsilon_{t+1}^x \qquad \text{Equation 4}$$

where $\mu_\chi$ is a constant, $\rho_\chi$ is a first-order autocorrelation of the observed real rate of interest over a period of time, $\chi_t$ is a real rate value for time t, $\sigma'_\chi$ is selected such that a standard deviation of predicted real rate values approximate the standard deviation of the observed real rate of interest over a period of time, and $\epsilon_{t+1}^\chi$ is a shock term that is distributed as a standard normal variate. Of course, a different heteroskedastic stochastic process could be used as well as other types of functions to predict real rate values.

The constant and the first-order autocorrelation for the real rate are determined in the same manner as the constant and the first-order autocorrelation, respectively, for inflation. In one embodiment, the value of the unconditional mean for the real rate is related to the constant by $$\mu_\chi = (1-\rho_\chi)\bar{\mu}_\chi \qquad \text{Equation 5}$$

where $\bar{\mu}_\chi$ is the unconditional mean of the observed real rate over a period of 45 years; however, other values and time periods may also be used.

As with $\sigma'_\pi$, the value for $\sigma'_\chi$ is determined to maintain the standard deviation of Equation 4 consistent with the standard deviation of the historically observed real rate. In one embodiment, $$\sigma'_x = \sigma_x \sqrt{\frac{(1-\rho_x^2)}{\bar{\mu}_x}} \qquad \text{Equation 6}$$

where $\sigma_\chi$ is the standard deviation of the implied real rate over the period of time and $\bar{\mu}_\chi$ is the unconditional mean of the implied real rate over the period of time; however, other values may also be used.

Equation 4 also includes a shock value for the real rate ($\epsilon_{t+1}^\chi$). This term is also distributed as a standard normal variate. It is important to note that $\epsilon_{t+1}^\chi$ is independent of $\epsilon_{t+1}^\pi$. This is done so that the shock term for inflation does not affect the shock term for the real rate. Alternatively, the terms $\epsilon_{t+1}^\chi$ and $\epsilon_{t+1}^\pi$ may be correlated in such a manner that is observed between the historical real rate and historical inflation.

Furthermore, in one embodiment, calibration of the real rate parameters described above is based on observed short-term nominal interest rates and inflation. In one embodiment, the short-term nominal rate, $r_t$, is determined according to the Fisher Hypothesis:

$$r_t = x_t + \mu_\pi + \rho_\pi \pi_t - \frac{1}{2}\sigma'^2_\pi \pi_t \qquad \text{Equation 7}$$

Thus, historical values of the real rate can be determined by the historical values for inflation, the nominal rate of interest and parameter values of inflation. These implied historical values of the real rate can be utilized to calibrate the real rate process described above.

The short-term nominal rate is approximately equal to the real rate plus expected inflation. Because inflation is determined by Equation 1 and the real rate is determined by Equation 4, simulation of the short-term nominal rate may be performed according to Equation 7 with the only additional data needed being a variance for inflation ($\sigma'^2_\pi$), the constant term for the inflation process, and the autocorrelation value for the inflation process.

In one embodiment, real rate values are determined and stored on a server where a client may download the values when using the pricing module. Alternatively, real rates may be determined on a user's computer, such as a desktop personal computer.

C. Dividend Growth

In one embodiment, dividend growth is a homoskedastic stochastic process. A homoskedastic stochastic process is one that has a constant variance over time. Because dividend growth has a constant variance that is not related to past values as is the case with a heteroskedastic stochastic process, the values for dividend growth may fluctuate more widely than the values of inflation and the real rate. In one embodiment, dividend growth is determined according to:

$$\Delta d_{t+1} = \mu_d + \rho_d \Delta d_t + \sigma'_d \epsilon_{t+1}^{\Delta d} \qquad \text{Equation 8}$$

where $\mu_d$ is a constant term, $\rho_d$ is a first-order autocorrelation for the observed dividend growth over a period of time, $\Delta d_t$ is a dividend growth value for time t, $\sigma'_d$ is selected such that the standard deviation of predicted dividend growth values are approximately equal to the standard deviation of observed dividend growth for the period of time, and $\epsilon_{t+1}^{\Delta d}$ is a value that is distributed as a standard normal variate. Of course, other homoskedastic processes as well as other types of processes, for example, processes embedding stochastic volatility, may be used to determine dividend growth.

The value for the constant and the value for the first-order autocorrelation for observed dividend growth are determined in the same manner as the mean values and autocorrelation values discussed above with respect to inflation and the real rate. In one embodiment, the constant is $$\mu_d = (1 - \rho_d)\bar{\mu}_d \qquad \text{Equation 9}$$

where $\bar{\mu}_d$ is the unconditional mean for observed dividend growth over a period of time. In one embodiment, the period of time is 45 years.

In a similar manner as Equations 1 and 4 discussed above, $\sigma'_d$ is determined such that the standard deviation of Equation 8 approximates the observed standard deviation of dividend growth over a period of time. In one embodiment, $$\sigma'_d = \sigma_d \sqrt{(1-\rho_d^2)} \qquad \text{Equation 10}$$

where $\sigma_d$ is the standard deviation of observed dividend growth over the period of time. Of course, other values may also be used.

It is important to note that $\sigma'_d$ is not multiplied by a past dividend growth value. This is because Equation 8 is a homoskedastic process wherein future variance of dividend growth values are not related to the preceding values for dividend growth. In real economies, the variance of dividend growth is generally not based on past dividend growth and dividend growth experiences more fluctuations than inflation and the real rate.

Equation 8 also includes a shock value ($\epsilon_{t+1}^d$) for dividend growth. In one embodiment, $\epsilon_{t+1}^d$ is independent of $\epsilon_{t+1}^x$ and $\epsilon_{t+1}^\pi$. Alternatively, $\epsilon_{t+1}^d$ may have some kind of correlation with $\epsilon_{t+1}^x$ and/or $\epsilon_{t+1}^\pi$.

D. Term Structure Risk Parameter

The free parameter associated with term structure risk is one of two free parameters in the pricing module. These free parameters are used to fine tune the pricing module so that projected results match historical results within an acceptable degree of accuracy. In one embodiment, the term structure risk parameter ($\lambda$) is determined as approximately equal to the slope of a yield curve at a particular time. Conceptually, the term structure risk is the risk premium people require to hold longer period bonds compared to shorter period bonds. Alternatively, other types of values may be used for term structure risk.

In one embodiment, the term structure risk parameter is determined empirically, such that the outputs of the pricing module match historical values. This may be done, for example, by starting at some historical point of time and projecting values for some historical period of time. The outputs are then compared to observed values for the same historical period. The term structure risk parameter may then be modified and the process repeated until the output of the pricing module is sufficiently accurate.

E. Equity Correlation Parameter

The equity correlation parameter is the second of two free parameters in the pricing module. In one embodiment, the equity correlation parameter ($\beta$) is determined as the correlation between dividend growth and the pricing kernel (discussed below). The equity correlation parameter is determined in the same manner as the term structure risk parameter discussed above.

The term structure risk and the equity correlation parameters are adjusted empirically to generate simulated outputs consistent with observed historical values of key economic variables (or for particular historical moments of key economic variables). In one embodiment, the term structure risk parameter is set at 6.5 and the equity correlation parameter is set at −0.25; however, other values may be used. These values are updated periodically so that outputs of the pricing module reflect observed historical moments of key economic variables.

F. Real Pricing Kernel

In one embodiment, pricing of assets is accomplished with a pricing kernel (or stochastic discount factor). A real pricing kernel, $\hat{M}_t$, is a positive stochastic process that ensures that all assets (j=1,2, ... ,n) are priced such that $$1 = E[(1+\hat{R}_{i,t+1})\hat{M}_{t+1}] \qquad \text{Equation 11}$$

where $\hat{R}_{i,t+1}$ is the percentage real return on asset i over the period from t to t+1 and E represents an expectation operator. The existence of such a pricing kernel is ensured in any arbitrage free economy. In one embodiment, the real pricing kernel is $$\hat{m}_{t+1} = -\frac{1}{2}\beta^2 - \left(1 + \frac{\lambda^2}{2}\right)x_t + \lambda\sqrt{x_t}\,\varepsilon_{t+1}^x + \beta\varepsilon_{t+1}^{\Delta d} \qquad \text{Equation 12}$$

where $$\hat{m}_{t+1} = \ln(\hat{M}_{t+1}). \qquad \text{Equation 13}$$

G. Nominal Pricing Kernel

In order to price nominally denominated assets, a nominal pricing kernel is used. Under the nominal pricing kernel, $M_{t+1}$, all assets (j=1,2, ... , n) are priced such that $$1 = E[(1+R_{i,t+1})M_{t+1}]$$ Equation 14 where $R_{i,t+1}$ is the percentage nominal return on asset i over the period from t to t+1. In one embodiment, the logarithm of the nominal pricing kernel, $m_{t+1} = \ln(M_{t+1})$ is the logarithm of the real pricing kernel minus inflation $$m_{t+1} = \hat{m}_{t+1} - \pi_{t+1}$$ Equation 15

Thus, the nominal pricing kernel is $$m_{t+1} = -\frac{1}{2}\beta^2 - \mu_\pi - \left(1 + \frac{\lambda^2}{2}\right)x_t -$$
$$\rho_\pi \pi_t + \lambda\sqrt{x_t}\,\varepsilon_{t+1}^x + \beta\varepsilon_{t+1}^{\Delta d} - \sigma'_\pi \sqrt{\pi_t}\,\varepsilon_{t+1}^\pi$$ Equation 16

The nominal pricing kernel is used to generate nominal prices of assets.

H. Bond Pricing

In one embodiment, using the pricing kernel of Equation 16, the price of any zero-coupon bond is determined by $$1 = E_t\left[\exp(m_{t+1})\frac{P_{n-1,t+1}}{P_{nt}}\right]$$ Equation 17 or $$\exp(P_{nt}) = E_t[\exp(m_{t+1} + p_{n-1,t+1})]$$ Equation 18 where $P_{nt}$ is the price at time t of a zero-coupon bond with maturity n. Also, $p_{nt} = \ln(P_{nt})$ and the n period continuous bond yield $y_{nt}$ is $$y_{nt} = -\frac{P_{nt}}{n}.$$ Equation 19

In one embodiment, $p_{nt}$ is $$p_{nt} = A_n + B_n \chi_t + C_n \pi_t$$ Equation 20 where $$A_n = A_{n-1} - \mu_\pi + B_{n-1}\mu_\chi + C_{n-1}\mu_\pi$$ Equation 21

$$B_n = \rho_x B_{n-1} - \left(1 + \frac{\lambda^2}{2}\right) + \frac{1}{2}(\lambda + B_{n-1}\sigma'_x)^2$$ Equation 22

$$C_n = \rho_\pi C_{n-1} - \rho_\pi + \frac{1}{2}(C_{n-1} - 1)^2 \sigma'^2_\pi$$ Equation 23 and $$A_0 = B_0 = C_0 = 0.$$ Equation 24

Thus, by using the equations discussed above, bond pricing may be determined for both long-term and short-term bonds.

I. The Pricing of Equity

In one embodiment, the pricing of equity is determined by $$V_t = E_t[M_{t+1}(D_{t+1} + V_{t+1})]$$ Equation 25 where $V_t$ is the nominal value of the stock market at time t and $D_{t+1}$ represents equity dividend values. Thus the price-dividend ratio (which is the same in real and nominal terms) is $$pd_t = \frac{V_t}{D_t} = E_t\left\{\sum_{i=1}^{\infty} \exp\left[\prod_{j=1}^{i}(m_{i+j} + \Delta d_{i+j})\right]\right\}$$ Equation 26 and the following transversality condition is imposed $$\lim_{n \to \infty} E_t\left[\left(\prod_{i=1}^{n} M_{i+j}\right)V_{i+n}\right] = 0$$ Equation 27

The price-dividend ratio of Equation 26 is highly non-linear and cannot be easily evaluated because expectations must be taken over complicated distribution of future pricing kernel and dividend variables. Therefore, in one embodiment, equilibrium price-dividend ratio is calculated as the infinite sum of exponentials of affine functions in three variables $$pd_t = \sum_{i=1}^{\infty} \exp(a_i + b_i x_t + c_i \pi_t + f_i \Delta d_t)$$ Equation 28 where $$a_{i+1} = \bar{a} + a_i + b_i\mu_x + c_i\mu_\pi + f_i[\mu_d + \sigma_d^2 + \beta\sigma'_d] + \frac{1}{2}f_i\sigma_d^2$$ Equation 29

$$b_{i+1} = \bar{b} + b_i[\rho_x + \lambda\sigma'_x] + \frac{1}{2}b_i^2 \sigma'^2_x$$ Equation 30

$$c_{i+1} = \bar{c} + c_i[\rho_\pi + \sigma'^2_\pi] + \frac{1}{2}c_i^2 \sigma'^2_x$$ Equation 31 and $$f_{i+1} = \bar{f} + f_i \rho_d$$ Equation 32

In one embodiment, Equations 27–30 are evaluated using $$a_1 = \bar{a} = \mu_d + \beta\sigma'_d + \frac{\sigma'^2_d}{2} - \mu_\pi$$ Equation 33

$$b_1 = \bar{b} = -1$$ Equation 34

$$c_1 = \bar{c} = \frac{\sigma'^2_\pi}{2} - \rho_\pi$$ Equation 35

$$f_1 = \bar{f} = \rho_d$$ Equation 36 and $$a_0 = b_0 = c_0 = f_0 = 0$$ Equation 37

Equation 28 may be determined as an infinite sum by computations well known in the art. However, as a simplification, Equation 28 may be approximated by a summation of a finite number of terms. Alternatively, Equation 28 may be approximated to a high degree of accuracy by a summation of polynomial terms of the state variables using linear regression methodology described below.

Additionally, in one embodiment, stock returns ($R_{t+1}$) are determined according to:

$$R_{t+1} = \frac{V_{t+1} + D_{t+1}}{V_t} = \frac{e^{\Delta d_{t+1}}(1 + pd_{t+1})}{pd_t}.\qquad \text{Equation 38}$$

In one embodiment, the equity returns are mapped from the state variables via a simple linear function. Because the relationship between the state variables and equity returns is non-linear, a linear function provides only an approximation. The fit between the state variables and equity returns can be improved by using a log-linear mapping. In a log-linear mapping, the equity returns are transformed via a logarithmic function prior to mapping with the state variables according to $\ln[R_t]$ where $R_t$ is the equity return value. The mapping can be improved further through use of a quadratic mapping between the state variables and return values. Of course, increasing the degree of the mapping, for example, to third-order terms would increase accuracy further. However, increasing the degree of fit beyond third-order terms provides little improvement with an increased cost of computing resources.

Computer Systems for a Financial Advisory System having a Pricing Module

Figure 3:
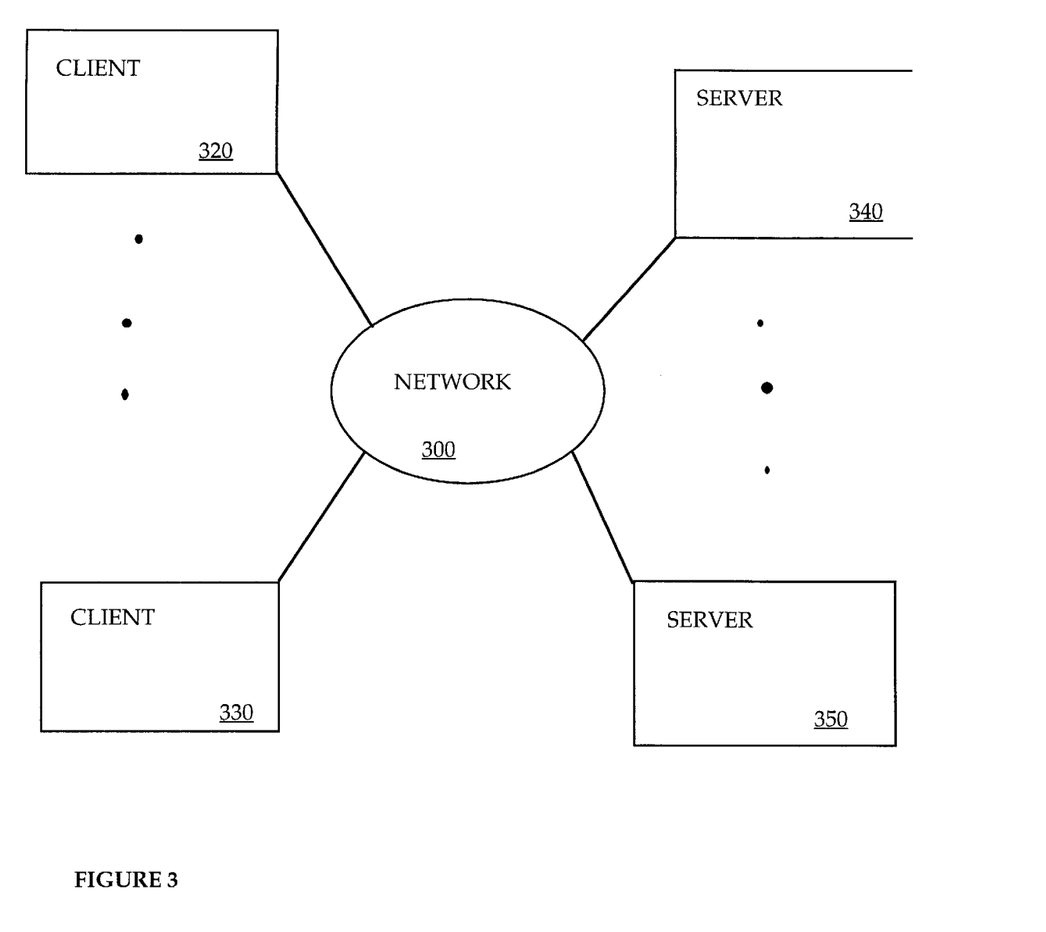
FIG. 3 is one embodiment of a client-server system upon which the present invention may be implemented.

FIG. 3 is one embodiment of a network that may provide a financial advisory system having a pricing module according to the present invention. As mentioned above, modules of a financial advisory system may reside on different computers. For reasons of simplicity, only two client and two servers are included in FIG. 3; however, any number of clients and servers may be used.

Network 300 provides a connection between one or more clients, such as clients 320 and 330 and one or more servers, such as servers 340 and 350. Network 300 may be any type of network. For example, network 300 may be the Internet and the clients and servers connected thereto may be World Wide Web (WWW or the Web) servers and clients. Thus, a Web page may include modules of a financial advisory system. Alternatively, network 300 may be an intranet, such as a local area network (LAN) or a wide area network (WAN), or network 300 may be a telephone system. If network 300 is a telephone system, clients and servers are connected via modems (not shown in FIG. 3) in a manner well known in the art.

In one embodiment, pricing module 110 resides in clients 320 and 330 while the remaining modules of the financial advisory system reside on one or more servers. For example, parameter module 100 may reside in server 340. Clients 320 and 330 communicate with server 340 to obtain state variable data and free variable data. Simulation module 140 may reside on server 350, such that clients 320 and 330 communicate the pricing data output from pricing module 110 to server 350 for simulation. Alternatively, simulation module 140 may reside on clients 320 and 330, which permits distributed processing of simulation scenarios. Of course, other combinations may also be used, such as pricing module on a client and the remaining modules on a single server, or more widely distributed modules on clients or servers.

Figure 4:
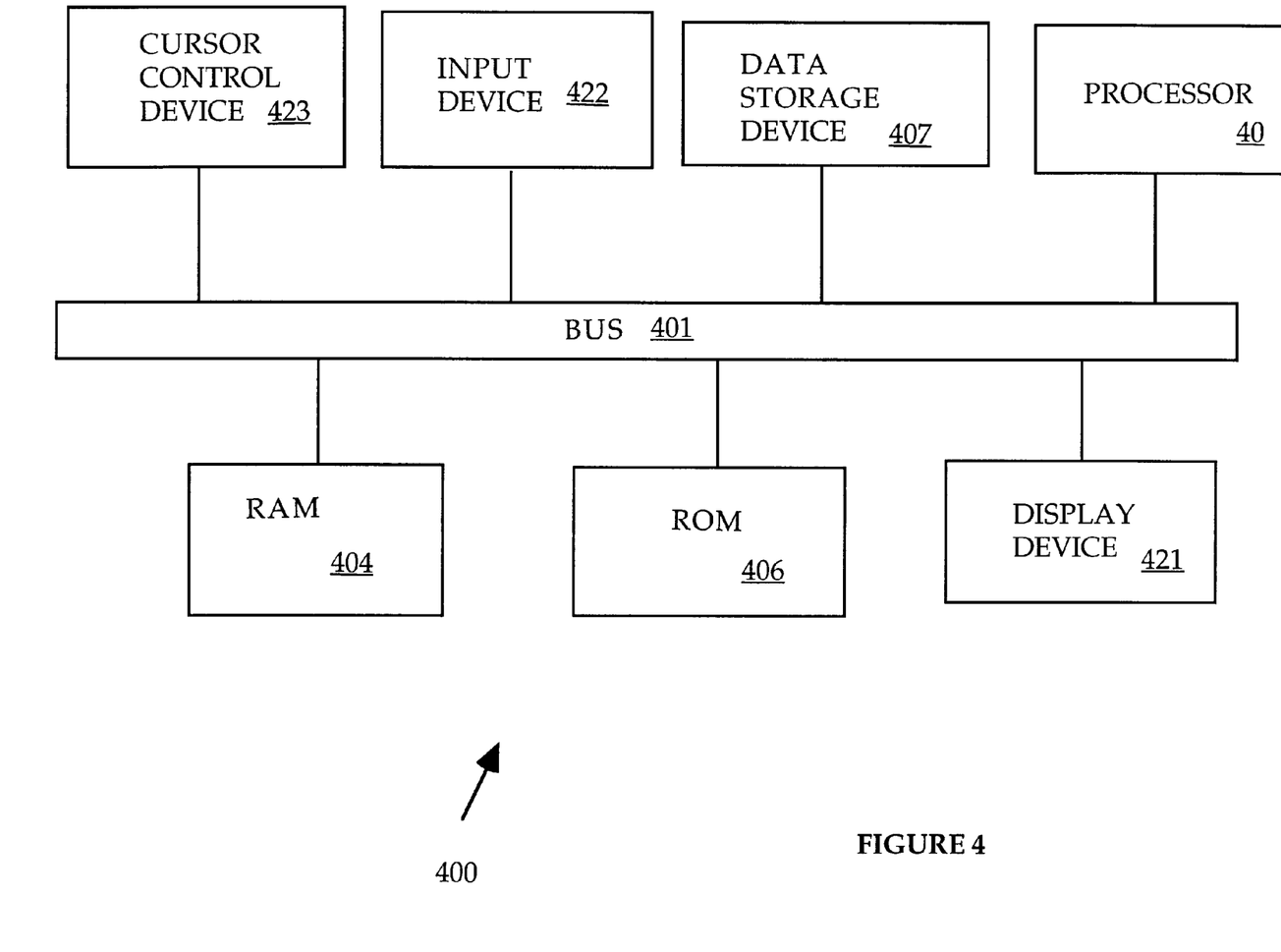
FIG. 4 is one embodiment of a computer system upon which the present invention may be implemented.

FIG. 4 is one embodiment of a computer system upon which an embodiment of the present invention can be implemented. The computer system of FIG. 4 may be either a client or a server of FIG. 3.

Computer system 400 comprises a bus 401 or other communication means for communicating information, and a processor 40 coupled with bus 401 for processing information. Computer system 400 further comprises a random access memory (RAM) or other dynamic storage device 404, coupled to bus 401 for storing information and instructions to be used by processor 40. Computer system 400 also comprises a read only memory (ROM) and/or other static storage device 406 coupled to bus 401 for storing static information and instructions for processor 40. Data storage device 407 is coupled to bus 401 for storing information and instructions.

A data storage device 407 such as a magnetic disk or optical disc and its corresponding drive can be coupled to computer system 400. Computer system 400 can also be coupled via bus 401 to a display device 421, such as a cathode ray tube (CRT), or a liquid crystal display (LCD) for displaying information to a computer user. An alphanumeric input device 422 such as a keyboard is typically coupled to bus 401 for communicating information and command selections to processor 40. Another type of user input device is cursor control 423, such as a mouse, a trackball, or cursor direction keys for communicating direction information and command selections to processor 40 and for controlling cursor movement on display 421.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a computer system, a method for pricing equity securities and fixed-income securities having a no arbitrage constraint, the method comprising:

determining a fixed-income security pricing based on an inflation value, a real rate value and a term structure parameter;

determining equity security pricing based on the inflation value, the real rate value, the term structure risk parameter, a dividend growth value, and an equity correlation parameter; and generating pricing data corresponding to the fixed-income security pricing and the equity security pricing.

2. The method of claim 1, wherein the fixed-income securities comprise:

one or more short term-bonds; and one or more long-term bonds.

3. The method of claim 1, wherein the equity securities comprise one or more stocks, mutual funds, warrants, stock options, or derivative equity securities.

4. The method of claim 1 further comprising receiving the inflation value.

5. The method of claim 1 further comprising receiving the real rate value.

6. The method of claim 1 further comprising the step of receiving the term structure risk parameter.

7. The method of claim 1 further comprising the step of receiving the dividend growth value.

8. The method of claim 1 further comprising the step of receiving the equity correlation parameter.

9. The method of claim 1, wherein the term structure risk parameter and the equity correlation parameter are determined such that when determining fixed-income security pricing and determining equity security pricing are performed for one or more chosen historical times that the pricing approximates observed fixed-income security pricing and observed equity security pricing for the chosen historical times.

10. The method of claim 1, wherein the inflation value is determined as a heteroskedastic stochastic process.

11. The method of claim 10, wherein the inflation value at time t+1 ($\pi_{t+1}$) is determined according to:

$$\pi_{t+1} = \mu_\pi + \rho_\pi \pi_t + \sigma'_\pi \sqrt{\pi_t}\, \varepsilon^\pi_{t+1}$$

where $\mu_\pi$ is a constant determined based on an unconditional mean for observed inflation over a period of time, $\rho_\pi$ is a first-order autocorrelation for the observed inflation over the period of time, $\pi_t$ is an inflation value for time t, $\sigma'_\pi$ is selected such that a standard deviation of a plurality of predicted inflation values corresponding to the period of time is approximately equal to a standard deviation of the observed inflation for the period of time, and $\epsilon_{t+1}^\pi$ is a value chosen by a standard normal random deviate function.

12. The method of claim 1, wherein the real rate of interest value is determined as a heteroskedastic stochastic process.

13. The method of claim 12, wherein the real rate value at time t+1 ($\chi_{t+1}$) is determined according to:

$$x_{t+1} = \mu_x + \rho_x x_t + \sigma'_x \sqrt{x_t}\, \varepsilon^x_{t+1}$$

where $\mu_\chi$ is a constant determined based on an unconditional mean for observed real rate over a period of time, $\rho_\chi$ is a first-order autocorrelation of the observed real rate of interest over the period of time, $\chi_t$ is a real rate value for time t, $\sigma'_\chi$ is selected such that a standard deviation of a plurality of predicted real rate values corresponding to the period of time is approximately equal to a standard deviation of the observed real rate of interest over the period of time, and $\epsilon_{t+1}^\chi$ is a value chosen by a standard normal random deviate function.

14. The method of claim 13, wherein the estimated real rate of interest is determined based on a short-term nominal rate of interest and a value of inflation is based on expected inflation and the nominal short-term rate of interest.

15. The method of claim 14, wherein the short-term nominal rate of interest is determined according to:

$$r_t = x_t + \mu_\pi + \rho_\pi \pi_t - \frac{1}{2}\sigma'^2_\pi \pi_t$$

where $\mu_\pi$ is a constant determined based on an unconditional mean of observed inflation over a period of time, $\rho_\pi$ is a first-order autocorrelation for inflation over the period of time, $\pi_t$ is an inflation value for time t, and $\sigma'^2_\pi$ is a variance of the innovations in the inflation process over the period of time.

16. The method of claim 1, wherein the dividend growth value is determined as a homoskedastic stochastic process.

17. The method of claim 16, wherein the dividend growth value at time t+1 ($\Delta d_{t+1}$) determined according to:

$$\Delta d_{t+1} = \mu_d + \rho_d \Delta d_t + \sigma'_d \epsilon_{t+1}^{\Delta d}$$

where $\mu_d$ is a constant determined based on an unconditional mean for observed dividend growth over a period of time, $\rho_d$ is a first-order autocorrelation for the observed dividend growth over the period of time, $\chi_d$ is a dividend growth value for time t, $\sigma'_d$ is selected such that a standard deviation of a plurality of predicted dividend growth values corresponding to the period of time approximately equal to a standard deviation of observed dividend growth for the period of time, and $\epsilon_{t+1}^{\Delta d}$ is a value chosen by a standard normal random deviate function.

18. The method of claim 1, wherein the term structure risk ($\lambda$) value is approximately equal to a slope of a yield curve at a particular time for a representative investor.

19. The method of claim 1, wherein the equity correlation ($\beta$) value is determined based on observed equity behavior with respect to observed bond behavior.

20. The method of claim 1, wherein the step of determining fixed-income security pricing comprises the step of determining an n-period yield ($y_{nt}$) according to:

$$y_{nt} = \frac{-p_{nt}}{n}$$

where $p_{nt}$ is a logarithm of a time, t, of a default-free bond paying one dollar in n years.

21. The method of claim 20, wherein $p_{nt}$ is:

$$p_{nt} = A_n + B_n \chi_t + C_n \pi_t$$

where $$A_n = A_{n-1} = \mu_\pi + B_{n-1}\mu_\chi + C_{n-1}\mu_\pi$$

$$B_n = \rho_x B_{n-1} - \left(1 + \frac{\lambda^2}{2}\right) + \frac{1}{2}(\lambda + B_{n-1}\sigma'_x)^2$$

$$C_n = \rho_\pi C_{n-1} - \rho_\pi + \frac{1}{2}(C_{n-1}-1)^2 \sigma'^2_\pi$$

and $$A_0 = B_0 = C_0 = 0$$

and where $\chi_t$ is a real rate value for time t, $\pi_t$ is an inflation value for time t, $\mu_\pi$ is a constant determined based on an unconditional mean for observed inflation over a period of time, $\mu_\chi$ is a constant determined based on an unconditional mean for observed real rate over the period of time, $\rho_\chi$ is a first order autocorrelation of the observed real rate of interest over the period of time, $\lambda$ is approximately equal to a slope of a yield curve at a particular time, $\sigma'_\pi$ is selected such that a standard deviation of a plurality of predicted inflation values corresponding to the period of time is approximately equal to a standard deviation of the observed inflation for the period of time, $\rho_\pi$ is a first order autocorrelation for the observed inflation over the period of time, and $\sigma_\pi^2$ is a variance of the observed inflation over the period of time.

22. The method of claim 1, wherein determining equity security pricing comprises determining a price to dividend ratio at a time, t, ($pd_t$) according to:

$$pd_t = \sum_{i=1}^{\infty} \exp[a_i + b_i x_i + c_i \pi_i + f_i \Delta d_i]$$

where $$a_{i+1} = \bar{a} + a_i + b_i \mu_x + c_i \mu_\pi + f_i[\mu_d + \sigma_d^2 + \beta \sigma_d'] + \frac{1}{2} f_i \sigma_d^2$$

$$b_{i+1} = \bar{b} + b_i[\rho_x + \lambda \sigma_s'] + \frac{1}{2} b_i^2 \sigma_x'^2$$

$$c_{i+1} = \bar{c} + c_i[\rho_\pi - \sigma_\pi'^2] + \frac{1}{2} c_i^2 \sigma_\pi'^2$$

$$f_{i+1} = \bar{f} + f_i \rho_d$$

and $$a_0 = b_0 = c_0 = f_0 = 0$$

and where $\chi_t$ is a real rate value at time t, $\pi_t$ is an inflation value at time t, $\Delta d_t$ is a dividend growth value at time t, $\mu_\pi$ is a constant determined based on a mean for observed inflation over a period of time, $\rho_\pi$ is a first-order autocorrelation for the observed inflation over the period of time, $\sigma_\pi'^2$ is a variance of the observed inflation over the period of time, $\mu_\chi$ is a constant determined based on a mean for observed real rate over the period of time, $\rho_\chi$ is a first-order autocorrelation of the observed real rate of interest over the period of time, $\sigma_\chi'$ is selected such that the variance of an inflation process is approximately equal to observed inflation over the period of time, $\mu_d$ is a constant determined based on a mean for observed dividend growth over the period of time, $\rho_d$ is a first-order autocorrelation for dividend growth over the period of time, $\sigma_d'$ is selected such that a standard deviation of a plurality of dividend growth values corresponding to the period of time is approximately equal to a standard deviation of observed dividend growth for the period of time, and $\beta$ is the equity correlation parameter.

23. The method of claim 22, wherein equity security returns are determined according to:

$$R_{t+1} = \frac{P_{t+1} + V_{t+1}}{P_t} = \frac{e^{\Delta d_{t+1}}(1 + pd_{t+1})}{pd_t}$$

where V is a value of a stock market.

24. In a computer system, a method for pricing equity securities and fixed-income securities having a no arbitrage constraint, the method comprising:

determining a term structure risk parameter based on observed term structure data;

determining an equity correlation parameter based on a correlation between equity dividends and fixed-income securities;

determining a heteroskedastic inflation value;

determining a heteroskedastic real rate value;

determining a homoskedastic dividend growth value;

pricing fixed-income securities based on the term structure risk parameter, the inflation value and the real rate value; and pricing equity securities based on the term structure risk parameter, the inflation value, the real rate value, the dividend growth value, and the equity correlation parameter; and generating pricing data corresponding to the fixed-income security pricing and the equity security pricing.

25. A system for analyzing asset portfolios comprising:

a value module that provides one or more values;

a pricing kernel communicably coupled to the value module, the pricing kernel to generate prices for fixed-income securities based on a term structure risk parameter, an inflation value and a real rate value and to generate prices for equity securities based on the term structure risk parameter, the inflation value, the real rate value, a dividend growth value, and an equity correlation parameter, wherein the pricing of fixed-income securities and the pricing of equity securities are subject to a no arbitrage constraint; and a simulation module communicatively coupled to the pricing kernel, the simulation module to estimate future asset worth based on the prices generated by the pricing kernel, the simulation module to generate pricing data corresponding to the fixed-income security pricing and the equity security pricing.

26. The system of claim 25, wherein the fixed-income securities comprise:

one or more short term-bonds; and one or more long-term bonds.

27. The system of claim 25, wherein the equity securities comprise one or more stocks.

28. The system of claim 25 wherein the parameter module provides the inflation value.

29. The system of claim 25 wherein the parameter module provides the real rate value.

30. The system of claim 25 wherein the parameter module provides the term structure risk parameter.

31. The system of claim 25 wherein the parameter module provides the dividend growth value.

32. The system of claim 25 wherein the parameter module provides the equity correlation parameter.

33. The system of claim 25, wherein the inflation value is determined as a heteroskedastic stochastic process.

34. The system of claim 25, wherein the real rate value is determined as a heteroskedastic stochastic process.

35. The system of claim 25, wherein the dividend growth value is determined as a homoskedastic stochastic process.

36. An apparatus for pricing fixed-income securities and equity securities having a no arbitrage constraint, comprising:

an input device;

an output device; and a processor coupled to the input device and to the output device to output pricing of fixed-income securities and equity securities, wherein fixed-income securities are priced based on a term structure risk parameter, an inflation value and a real rate value, and further wherein equity securities are priced based on the term structure risk parameter, the inflation value, the real rate value, a dividend growth value and an equity correlation parameter.

37. The apparatus of claim 36, wherein the term structure risk parameter is determined based on a slope of an observed yield curve relevant to a representative investor.

38. The apparatus of claim 36, wherein the equity correlation parameter is determined based on observed dividend behavior and with respect to observed bond behavior.

39. The apparatus of claim 36, wherein the term structure risk parameter and the equity correlation parameter are determined such that when fixed-income securities and equity securities are priced for one or more chosen historical times that the prices approximate observed fixed-income security prices and observed equity security prices, respectively, for the one or more chosen historical times.

40. A machine readable medium having stored thereon sequences of instructions, which when executed by one or more processors, cause one or more electronic devices to:
   determine a term structure risk parameter based on evaluation of a user;
   determine an equity correlation parameter based on a correlation between equity dividends and fixed-income securities;
   n equity correlation parameter based on a correlation between equity dividends and fixed-income securities;
   determine a heteroskedastic inflation value;
   determine a hetroskedastic real rate value;
   determine a homoskedastic dividend growth rate;
   price fixed-income securities based on the term structure risk parameter, the inflation value and the real rate value;
   price a equity securities based on the term structure risk parameter, the inflation value, the real rate value, the dividend growth value, and the equity correlation parameter; and
   generate pricing data corresponding to the fixed-income security pricing and the equity security pricing;
   wherein pricing fixed-income securities and pricing equity securities are subject to a no arbitrage constraint.

41. The machine readable medium of claim 40 wherein the fixed-income securities comprise:
   one or more short-term bonds; and
   one or more long-term bonds.

42. The machine readable medium of claim 40 wherein the equity securities comprise one or more stocks, mutual funds, warrants, stock options, or derivative equity securities.

43. The machine readable medium of claim 40, wherein the term structure risk parameter and the equity correlation parameter are determined such that when determining fixed-income security pricing and determining equity security pricing are performed for one or more chosen historical times that the pricing approximates observed fixed-income security pricing and observed equity security pricing for the chosen historical times.

44. The machine readable medium of claim 40, wherein the term structure risk ($\lambda$) value is approximately equal to a slope of a yield curve at a particular time for a representative investor.

45. The machine readable medium of claim 40, wherein the equity correlation ($\beta$) value is determined based on observed equity behavior with respect to observed bond behavior.

46. A machine readable medium having stored thereon sequences of instructions, which when executed by one or more processors, cause one or more electronic devices to:
   determine a fixed-income security pricing based on an inflation value, a real rate value and a term structure parameter;
   determine equity security pricing based on the inflation value, the real rate value, the term structure risk parameter, a dividend growth value, and an equity correlation parameter; and
   generate pricing data corresponding to the fixed-income security pricing and the equity security pricing.

47. The machine readable medium of claim 46 wherein the fixed-income securities comprise:
   one or more short-term bonds; and
   one or more long-term bonds.

48. The machine readable medium of claim 46 wherein the equity securities comprise one or more stocks, mutual funds, warrants, stock options, or derivative equity securities.

49. The machine readable medium of claim 46, wherein the term structure risk parameter and the equity correlation parameter are determined such that when determining fixed-income security pricing and determining equity security pricing are performed for one or more chosen historical times that the pricing approximates observed fixed-income security pricing and observed equity security pricing for the chosen historical times.

50. The machine readable medium of claim 46, wherein the term structure risk ($\lambda$) value is approximately equal to a slope of a yield curve at a particular time for a representative investor.

51. The machine readable medium of claim 46, wherein the equity correlation ($\beta$) value is determined based on observed equity behavior with respect to observed bond behavior.

* * * * *